Aug. 23, 1932.　A. Y. DODGE　1,872,690
EXPANDING CLUTCH
Filed Oct. 21, 1929　2 Sheets-Sheet 1

INVENTOR.
Adiel Y. Dodge
BY H. O. Clayton
ATTORNEY

Aug. 23, 1932.    A. Y. DODGE    1,872,690
EXPANDING CLUTCH
Filed Oct. 21, 1929    2 Sheets-Sheet 2

INVENTOR.
Adiel Y. Dodge
BY H. O. Clayton
ATTORNEY

Patented Aug. 23, 1932

1,872,690

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

EXPANDING CLUTCH

Application filed October 21, 1929. Serial No. 401,037.

This invention relates to friction clutches of the radially expansible type and is illustrated as embodied in an automobile clutch.

An object of the invention is to provide a clutch having exceptionally powerful frictional engagement preferably secured by arranging one friction shoe to force another against the flywheel or an equivalent rotatable member when turning in the normal direction of rotation, while at the same time arranging considerable clutching action in the reverse direction of rotation, preferably by the provision of an additional shoe.

A further important feature of my invention resides in the provision of a very effective and simple clutch release mechanism and, in the preferred embodiment disclosed in the drawings, there is provided a bell crank type of lever pivotally connected at one of its ends to a shoe contacting cam structure and disconnectedly engaged at its other end by a novel clutch pedal operated release mechanism telescopingly mounted upon the driven shaft.

A minor but nevertheless important feature of my invention lies in the structure and arrangement of the clutch release mechanism whereby extended movement of the clutch pedal after release of the clutch serves through the clutch spring housing to brake the coasting vehicle through deceleration of the angular movement of the propeller shaft. I prefer to effect this result by keying the clutch spring housing directly to the driven shaft at A. In order to effect this function, it is necessary to leave the car in gear.

Further features of the invention, including details of construction such as the particular arrangement of the clutch pedal and its associated clutch spring and thrust bearing, and various other details of construction and novel combinations of parts will be apparent from the following description of a preferred embodiment of my invention shown in the accompanying drawings, in which.

Figure 1:
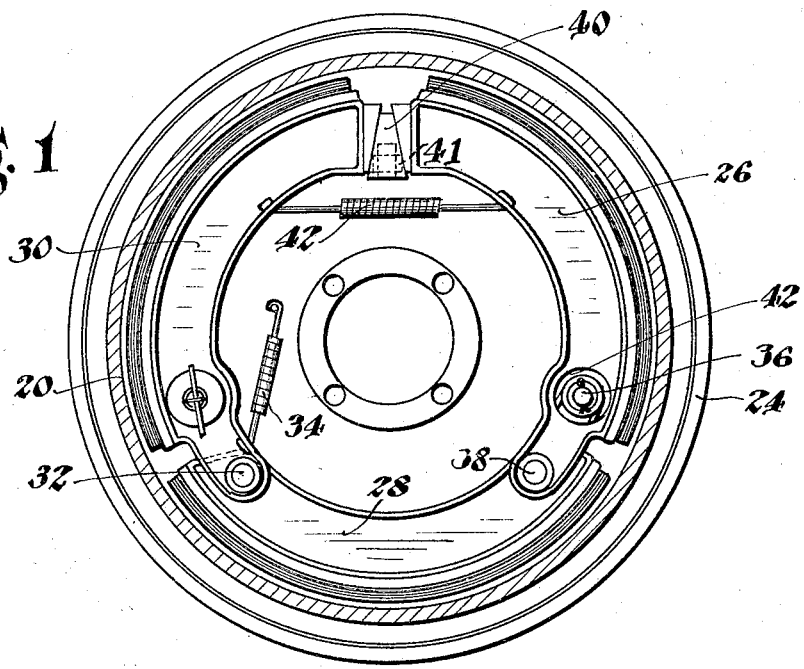
Figure 1 is an elevational view of the friction elements of my novel clutch.

As disclosed in the figures of the drawings, the clutch mechanism comprises generally a rotatable driving member such as a flywheel 20 having an internal cylindrical clutch surface, a driven propeller shaft 22 arranged co-axially of the driving flywheel, and a novel clutch mechanism for connecting and disconnecting the driving and driven parts.

On one end of the driven propeller shaft 22 there is provided a suitable support such as a plate 24 for the clutch mechanism. Within the flywheel 20 and mounted on the plate 24 are novel friction shoes 26, 28 and 30 arranged end to end, shoe 30 being preferably connected to the end of shoe 28 by a floating pivot 32 so that the shoe 30 normally acts to engage shoe 28 with the flywheel against the resistance of a return spring 34. Shoes 26 and 28 are pivotally connected at their adjacent ends to the support 24, shoe 26 being forked at its ends, as shown in Figure 1, to straddle the end of the shoe 28 and bring the friction portions of the two shoes close together.

In the arrangement shown in Figure 1, shoe 28 is directly connected to the support 24 by a pivot 36, while the shoe 26 is connected to the shoe 28 and thence through pivot 36 to support 24 by a pivot 38. The pivot 36 passes through relatively large openings in the arms of the ends of shoe 26 to give ample clearance and the shoes 26 and 30 are preferably made interchangeable. The aforementioned specific arrangement of the friction elements of the clutch is more completely described and claimed in my Patent No. 1,746,822, dated February 11, 1930.

The essence of my invention resides in a novel type of release mechanism for the aforementioned clutch friction elements and preferably comprises a cam wedge 40 for forcing the shoes 26 and 30 apart against the resistance of a spring 42 securing the shoes 26 and 30 together. The wedge 40 is preferably pivotally secured at 41 to the end of a bell crank lever 44 pivoted at 46 to a bracket 48 rigidly secured to the upper portion of the clutch support 24. The bell crank lever preferably extends downwardly and radially of the clutch, terminating in a yoke 49 straddling the driven shaft 22.

The bell crank 44 may be rotated about its fulcrum by a novel mechanism comprising a thrust bearing 50 of the ball bearing type, said thrust bearing being actuated axially along the driven shaft 22 by means of the clutch spring 52 in compression between a portion of the transmission housing 54 and a housing for the spring slidingly telescoped over the shaft. A second ball bearing type thrust bearing 58 is interposed between the clutch spring housing and a cylindrical spool-shaped release member 60, which release member contacts on the other side with the first-mentioned thrust bearing. The clutch is released by the clutch lever 62 usually but not necessarily operated by the foot, and which lever terminates in a yoke 64 having trunnion pins 66 engaging an annular recess in the clutch release member 60.

Figure 2:
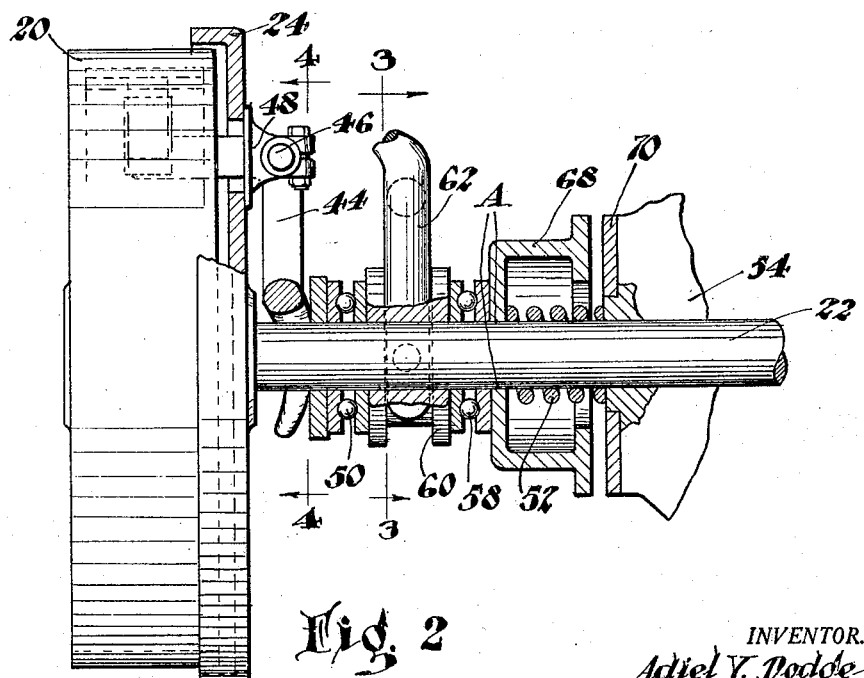
Figure 2 is a side elevation of the clutch release mechanism with part of the same broken away in central section.
Figure 3:
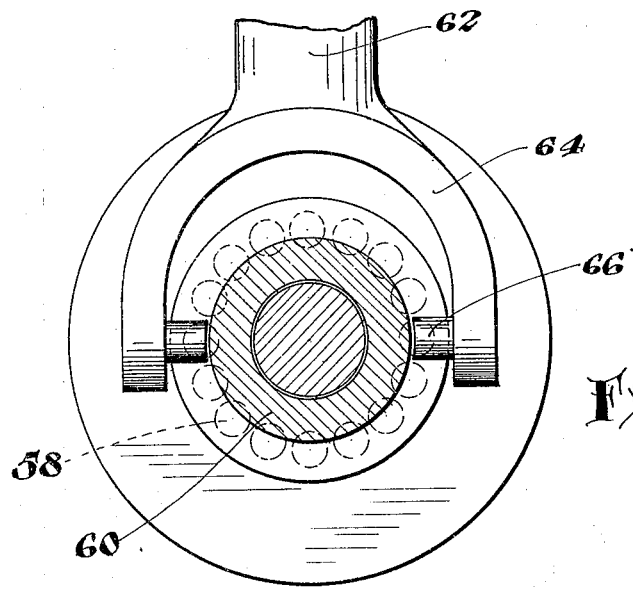
Figure 3 is a transverse section through the clutch pedal and release member on the line 3—3 of Figure 2.
Figure 4:
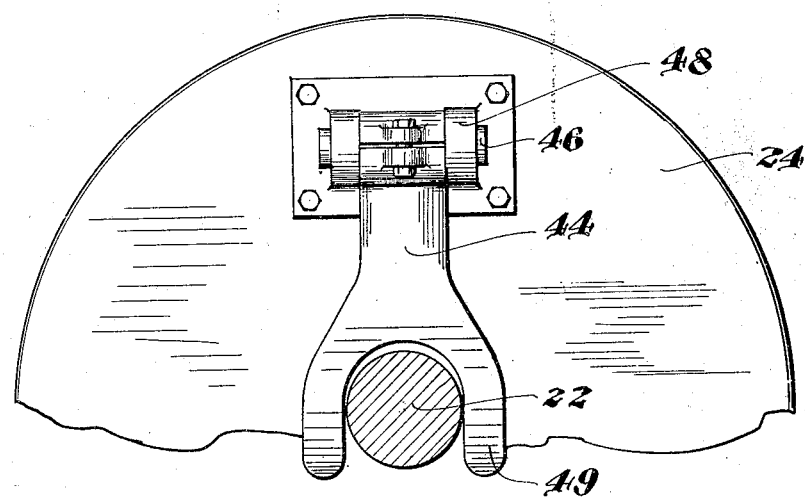
Figure 4 is a fragmentary section of the release mechanism looking in the direction of the arrows 4—4 of Figure 2 showing a part of the same in end elevation.

In operation, the clutch is released by actuation of the clutch lever forcing the release member 60 to the right in Figure 2 to compress the clutch spring 52, thereby releasing the tension in the springs 34 and 42 within the clutch to disengage the shoe elements of the same. Due to the sliding loose friction fit of the clutch release parts on the driven shaft 22, these parts are adapted to rotate therewith with the clutch engaged and in order to obviate the continued rotation of those parts to the right of the lever 62 with possible resulting undesirable noise, the end face of the clutch spring housing 68 is provided with a wide rim to contact a buffer of brake friction material 70 in the form of a ring secured to the transmission housing 54. This construction is what is known as a clutch brake.

This buffer also acts as a stop to limit the lateral release movement of the clutch lever 62, although it is obvious that the parts may be so arranged that a certain degree of lateral movement of the housing 68 might be effected with the resulting clutch release without its contacting the brake buffer.

If desired, the clutch spring housing 68 may be keyed at A (Figure 2) to the driven propeller shaft to rotate therewith and slide thereon. With this construction, the clutch housing 68 would revolve continuously with the propeller shaft and with the clutch released and the vehicle coasting but remaining in gear, extended movement of the clutch release lever to force said housing into engagement with the brake buffer member 70 serves to brake the rotation of the propeller shaft and thus, through the rear wheels, decelerate the movement of the coasting vehicle.

This case constitutes a continuation in part of my Patent No. 1,746,822, dated February 11, 1930.

While but one illustrative embodiment of the invention has been described in detail, it is not my intention to limit the scope of the invention to that particular embodiment or otherwise than by the terms of the appended claims.

I claim:

1. A clutch operating mechanism comprising a driven shaft, a lever pivotally supported by the shaft for actuating the clutch, a train of thrust members each of which is slidably mounted on said shaft, one of the ends of said train engaging the lever, a spring engaging the other end of said train to cause it to bear against said lever and thus engage the clutch, anti-friction thrust bearings between all the members of said train, and a fixed abutment adjacent the spring pressed end of said train having a face perpendicular to the axis of the shaft, one of the members of said train having a part adapted to make frictional contact with said abutment when said spring is compressed.

2. A clutch operating mechanism comprising a driven shaft, a lever pivotally supported by the shaft for actuating the clutch, a train of thrust members each of which is slidably mounted on said shaft, one of the ends of said train engaging the lever, a spring engaging the other end of said train to cause it to bear against said lever and thus engage the clutch, anti-friction thrust bearings between all the members of said train, and a fixed abutment adjacent the spring pressed end of said train having a face perpendicular to the axis of the shaft, one of the members of said train having a part adapted to make frictional contact with said abutment when said spring is compressed, said member being slidably and non-rotatably mounted on said shaft.

3. A clutch operating mechanism comprising a driven shaft, a lever pivotally supported by the shaft for actuating the clutch, a train of thrust members each of which is slidably mounted on said shaft, one of the ends of said train engaging the lever, a spring engaging the other end of said train to cause it to bear against the lever and thus engage the clutch, anti-friction thrust bearings between all the members of said train, and a fixed abutment adjacent the spring pressed end of said train having a face perpendicular to the axis of the shaft, one of the members of said train being manually movable in one direction to assist said spring in engaging the clutch and in the other direction to compress said spring and release the clutch, another of said members having a part adapted to make frictional contact with said abutment when said spring is compressed, said last mentioned member being slidably and non-rotatably mounted on said shaft.

4. A clutch operating mechanism comprising a driven shaft, a lever pivotally supported by the shaft for actuating the clutch, a train of thrust members slidably mounted on said shaft including a thrust washer disconnectedly engaging the lever, a clutch release member, an anti-friction thrust bearing between said washer and release member, a spring receiving member, and an anti-friction thrust bearing between said release member and said spring receiving member, a spring bearing against said spring receiving member to transmit thrust through said train to the lever, a fixed abutment adjacent said spring having a face perpendicular to the axis of the shaft, a cylindrical flange carried by the spring receiving member forming a housing enclosing the spring and an annular member carried by said cylindrical flange adapted to make frictional contact with said abutment when said spring is compressed, said spring receiving member being slidably and non-rotatably mounted on said shaft.

In testimony whereof, I have hereunto signed my name.

ADIEL Y. DODGE.